Feb. 19, 1935.  C. E. CARPENTER  1,991,492
DOUGHNUT COOKING MACHINE
Filed Feb. 15, 1933   3 Sheets-Sheet 1
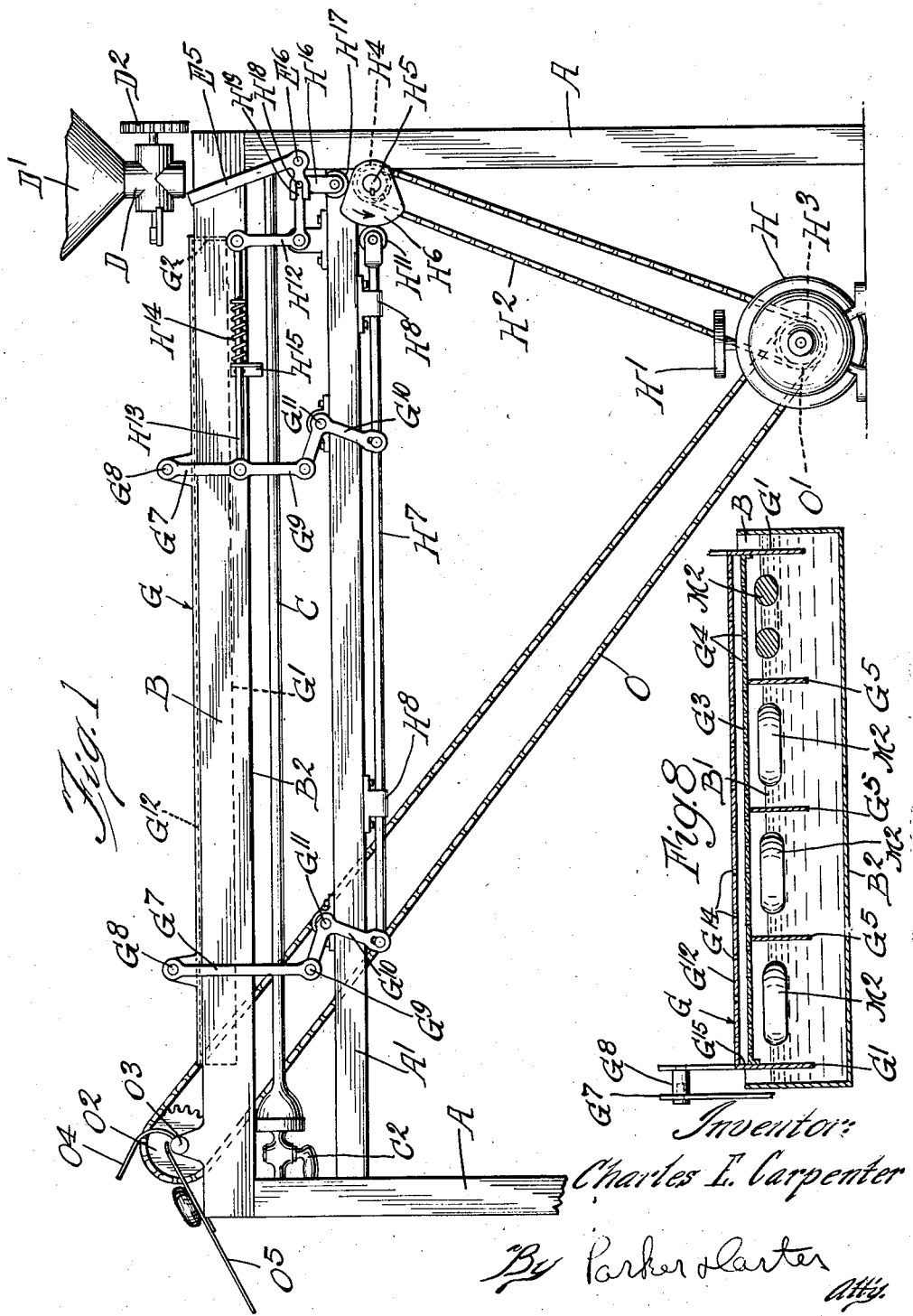

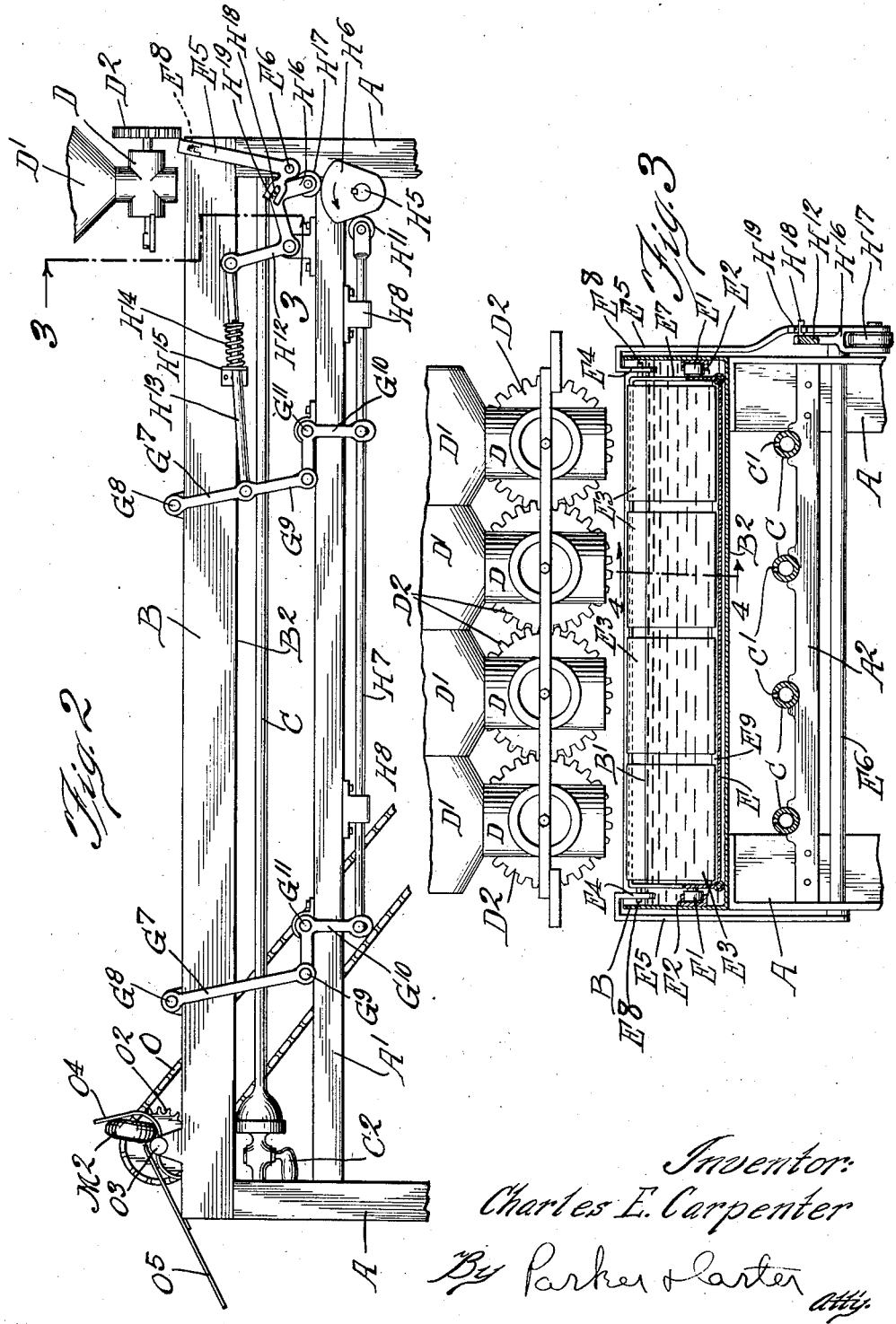

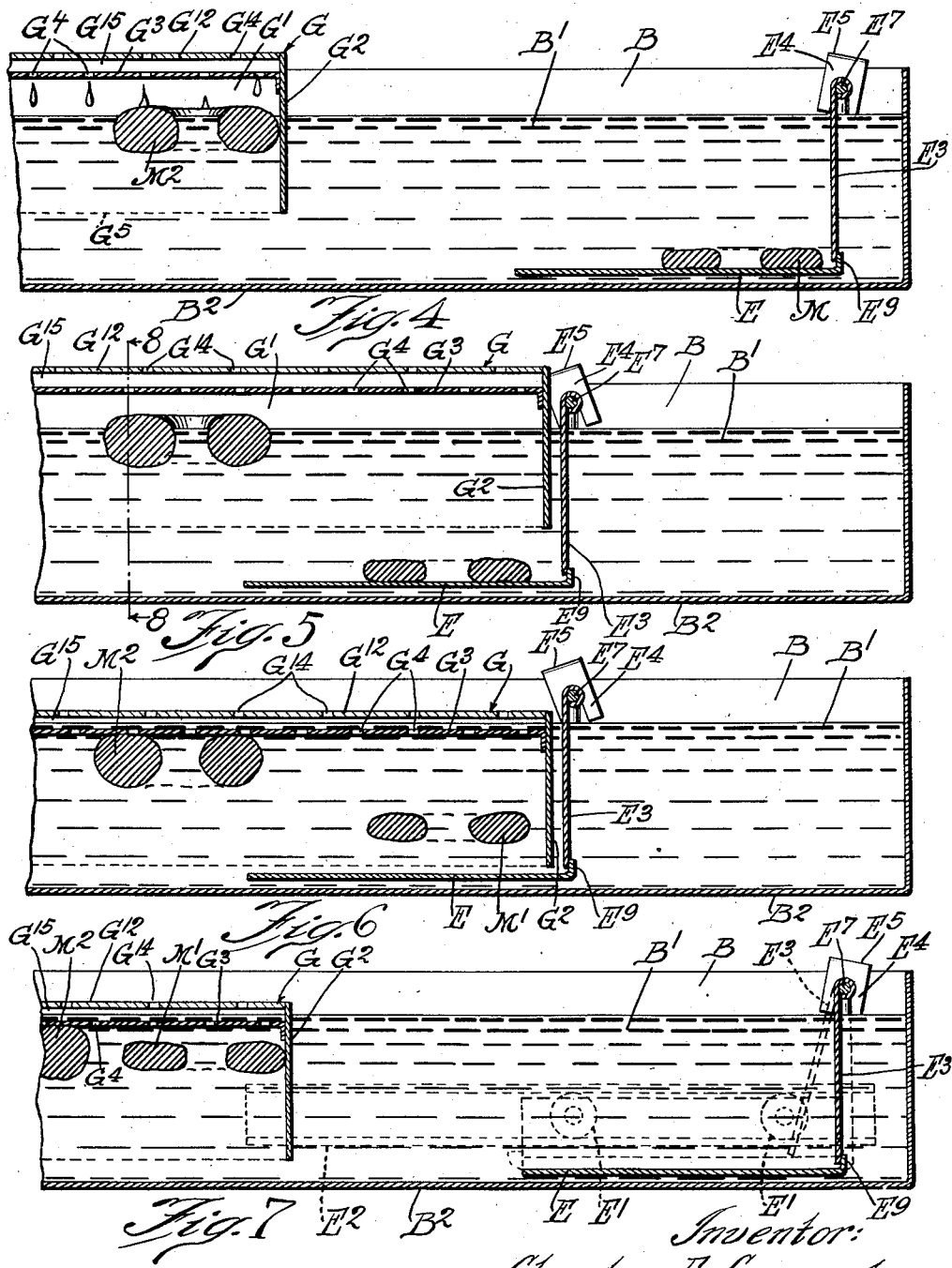

UNITED STATES PATENT OFFICE 1,991,492

DOUGHNUT COOKING MACHINE

Charles E. Carpenter, Chicago, Ill.

Application February 15, 1933, Serial No. 656,932

18 Claims. (Cl. 53—7)

My invention relates to a method of and apparatus for cooking doughnuts. One object is the provision of a means and method for cooking doughnuts in which turning of the doughnut is unnecessary. Another object is the provision of a means of and method for frictionally feeding doughnuts, during the course of their cooking, along or across the cooking pan. Another object is the provision of improved means for receiving the cut doughnut at the beginning of the cooking operation and for conveying it along the pan. Another object is the provision of a means and method for intermittently completely immersing the doughnut in the cooking grease and permitting it to float to the top of such grease during the cooking operation. Other objects will appear from time to time in the course of the specification and claims.

I illustrate my invention more or less diagrammatically in the accompanying drawings, wherein—

Figure 1 is a side elevation;

Figure 2 is a partial side elevation illustrating the parts in a different position;

Figure 3 is a section on the line 3—3 of Figure 2;

Figures 4, 5, 6 and 7 are vertical longitudinal sections through the feed end of the device, taken along the line 4—4 showing the feeding mechanism in different positions; and Figure 8 is a section on the line 8—8 of Figure 5 on a reduced scale.

Like parts are indicated by like symbols throughout the specification and drawings.

Referring to Figures 1 and 2, A generally indicates any suitable frame supports upon which are mounted the frame members $A^1$ and cross supports $A^2$.

B generally indicates a pan which may be of metal or the like and which may be supported directly upon the upper ends of the frame members A, it being understood that the details of the frame and the connection between the frame and the pan may be widely varied to suit particular conditions. It will be understood, however, that I provide a relatively long, flat, shallow pan B, which normally may be filled with hot grease for cooking purposes, the grease being indicated as at $B^1$ in Figures 3 to 7 inclusive. Positioned beneath the bottom $B^2$ of the pan B are any suitable cooking members. I indicate for example a plurality of pipes C which may be provided with gas apertures $C^1$ and which may be controlled by any suitable valve $C^2$. It will be understood that thereby a gas flame may be maintained beneath the bottom $B^2$ of the pan B, the gas members being herein shown as four parallel pipes. I wish it understood, however, that I do not wish to be limited to the precise number, shape, or location of pipes herein shown, as a wide variation may be employed. In feeding the cooking doughnuts from a plurality of cutters as will later appear, I do find it of advantage, however, to arrange the cooking flames along a plurality of parallel axes each such axis representing the general path travelled by a series of doughnuts undergoing cooking.

D, D, indicate a plurality of cutting members for cutting doughnut forms, each cutter receiving dough from one of the hopper members $D^1$ and being operated for example by a gear $D^2$. Inasmuch as the cutting members do not of themselves form part of the present invention I illustrate them only schematically, it being understood, however, that a plurality of cutting members are employed, that they may be operated in unison to deliver doughnuts in unison to the pan B and that the size and shape of the doughnuts delivered by the cutters may be varied in any suitable way so that, if desired, doughnuts of different shape or size may be at the same time delivered from different cutters.

Beneath the feed end of the device, that is to say, at the end where the cutters D deliver the doughnuts, I provide an initial receiving tray indicated as E. It is shown, as in Figure 3 and following, spaced somewhat above the bottom $B^2$ of the pan B and it may be supported in such positions, as by rollers or runners $E^1$ engaging channels or guides $E_2$ in the sides of the pan B. I may provide any suitable means for imparting to the tray E a longitudinal reciprocation. I illustrate for example the transverse frame member or rod $E^7$ to which are pivotally mounted a plurality of gates $E^3$ which in effect serve as a rear wall for the tray E, which is provided with an upwardly extending flange $E^9$ to limit counter-clockwise motion of the gates $E^3$. The transverse member $E^7$ is provided at either side with pins $E^8$ adapted to engage the slotted recurved ends $E^4$ of levers $E^5$ which may be bell crank levers pivoted as at $E^6$ on the frame A. The means for actuating the bell crank levers will later be discussed.

A second tray generally indicated as G is positioned within the pan A extending almost from end to end of the pan, but being sufficiently short to permit a rather substantial range of longitudinal reciprocation. This pan includes side frame members $G^1$, an end frame member $G^2$ at the feed end of the device and a top $G^3$ which may be perforated as by the apertures $G^4$. The tray also includes a plurality of longitudinal separating flanges or partitions generally indicated as $G^5$. If desired similar partitions may also be employed in connection with the initial receiving tray E. At the discharge end of the device the tray G has no end flange corresponding to $G^2$, it thus being flanged only on three sides and the longitudinal spaces between the flanges $G^5$ are thus closed at one end and at the sides but open at the discharge end of the device. The tray G may be mounted as upon links $G^7$ which are pivoted at their tops to the pan as at $G^8$ and at their bottoms, as at $G^9$, to bell crank levers $G^{10}$ which are pivoted as at $G^{11}$ on the frame member $A^1$.

The driving means is as follows. H indicates a motor or other suitable power source the speed of which may be controlled by any suitable control member herein indicated as $H^1$. $H^2$ is a drive chain extending from any suitable drive sprocket $H^3$ to a sprocket $H^4$ on a shaft $H^5$ which rotates the cam $H^6$. The cam $H^6$ engages the push rod $H^7$ which is mounted in bearings $H^8$ on the frame member $A^1$ and which is in operative engagement with both bell crank levers $G^{10}$ as shown for example in Figures 1 and 2. It is provided with a contact member or roller $H^{11}$ opposed to the cam $H^6$ and the weight of the pan will normally hold the member $H^{11}$ against said cam. $H^{12}$ indicates another bell crank lever the upper arm of which is connected as by the rod or link $H^{13}$ with one of the links $G^7$. $H^{14}$ indicates a spring compressed between the member $H^{13}$ and the pan B as by the abutment $H^{15}$, the spring thereby tending to move the member $H^{13}$ to the right, referring to the position of the parts in which they are shown in Figures 1 and 2. The opposite arm of the bell crank lever $H^{12}$ is crooked as at $H^{16}$ and provided with a contact member or roller $H^{17}$ which also abuts against the cam $H^6$. There is also a connection between the lever $E^5$ and the bell crank lever $H^{12}$ which is herein shown as a pin $H^{18}$ penetrating a slot $H^{19}$. It will be understood that the cam $H^6$ is rotated by the motor H in counter-clockwise direction, referring to the position of the parts in which they are shown in Figures 1 and 2. When the parts are as shown in Figure 1 the contact between the cam $H^6$ and the push rod $H^7$ is such that the bell cranks $G^{10}$ are rotated in lifting position, with the pan G raised to the position in which it is shown in Figure 4. As the cam continues its rotation its portion of maximum diameter passes beyond the roller $H^{11}$ and the bell crank levers $G^{10}$ are then free to rotate, to permit the links $G^7$ and the tray G to drop to the lower level, with the pan top $G^3$ positioned slightly below the level of the grease in the pan A. At the same time the roller $H^{17}$ of the bell crank lever $H^{12}$ is progressively lifted, which has the double effect of moving the upper end of the bell crank lever $H^{12}$ toward the discharge end of the pan A and of moving the upper end of the bell crank lever $E^5$ toward the feed end. In considering its drive in connection with the various positions of the pan shown, Figures 4 to 7, it will be understood that the effect of the rotation of the cam $H^6$ on the tray E is to move it first from the position in which it is shown in Figure 4 to the position it is shown in Figures 5 and 6 and again back to the position in which it is shown in Figures 4 and 7. While the tray F is thus being reciprocated, the tray G is given a more complex movement. Assume that the parts are in the position in which they are shown in Figure 4 with the tray raised, it moves toward the feed end of the pan A, while still raised, to the position in which it is shown in Figure 5. It then drops to the position in which it is shown in Figure 6 and then, while dropped, moves toward the discharge end to the position in which it is shown in Figure 7.

It will be understood that any suitable timing means may be employed so that the doughnuts are dropped from the cutters D at a time when the trays are in the position in which they are shown in Figure 4. M indicates such a doughnut, as shown in Figure 4, still flat because it is of uncooked dough and has not been in the hot grease long enough to cook very much. It therefore sinks to the bottom of the grease and rests on the tray E, which spaces it from the bottom of the pan A. Then the tray E moves toward the discharge end of the pan A and at the same time the tray G moves towards the feed end, until it overlies the tray E. It then drops into the position in which it is shown in Figure 6, but meanwhile the doughnut M has been subjected to the heat of the grease and begins to swell as shown at $M^1$, in Figure 6. It therefore begins to rise and rises above the level of the flange $G^2$. Thus, when the tray G again moves toward the discharge end of the pan A it draws with it the doughnut $M^1$, as shown in Figure 7, initially by contact with the flange $G^2$. But the cooking process continues and the doughnut swells or fluffs up and soon becomes sufficiently light to abut against the bottom of the top $G^3$ of the tray G as shown at $M^2$ in Figures 6 and 7. Therefore, at the next forward reciprocation of the pan G the now floating doughnut is propelled toward the discharge end of the pan A by frictional contact between its upper surface and the lower surface of the tray member $G^3$. This frictional conveying which is obtained without the necessity of positive driving members such as chains or the like, is a great advantage. After the tray reaches the end of its forward reciprocation toward the discharge end of the pan A it then lifts to the position shown in Figure 4 and the doughnut $M^2$ can now float freely with a portion of its upper surface extending upwardly above the level of the grease. The pervious top $G^3$ with the holes $G^4$ enables the air to escape from the doughnut during the cooking process. The doughnut is not actually submerged more than say a fraction of an inch below the surface, and air is boiling up out of the doughnut at that time, and can escape through the grease and through the holes in the tray. It carries with it more or less grease and this grease, with the grease picked up by the tray, drops back on the top of the doughnut, when the doughnut is floating on the surface of the grease, and assists in the cooking process. This dropping of the grease on the doughnut from the tray member $G^3$ is indicated in Figure 4. The escape of grease from the tray or its splattering about is prevented by the rim $G^{15}$ which is at all times above the level of the grease, as is clear from the position of the parts in Figures 6 and 7. It will be understood of course, that the flange $G^2$ and in fact all parts of the tray G are preferably provided with apertures or are otherwise made grease pervious.

It will be clear that the doughnuts are conveyed forwardly toward the discharge end by a step by step movement, all the steps except the first including a frictional conveying of the doughnut, the doughnut being intermittently entirely immersed beneath the surface of the grease, and permitted to float on the surface.

Although the tray G rises sufficiently to permit the doughnuts periodically to float, the perforated top has a substantial heat maintaining effect and keeps the doughnuts in a hot atmosphere. If desired this effect may be enhanced by employing a double top, including the more or less solid top member $G^{12}$, which further tends to keep the doughnut in a hot atmosphere. The top $G^{12}$ may be apertured sufficiently to permit the escape of air therethrough, as at $G^{14}$.

When the doughnuts reach the discharge end of the tank they are ejected therefrom by the following mechanism. O indicates a drive chain from a second sprocket $O^1$ driven by the motor H. The chain O passes about the sprocket $O^2$ on any suitable shaft $O^3$, which shaft is provided with a plurality of ejector paddles $O^4$ which are indicated in Figures 1 and 2. These paddles may be formed of a plurality of fingers or may be otherwise pervious so that no substantial volume of grease is picked up with the doughnuts but in fact the grease is permitted to drip freely from the doughnuts after they are lifted from the surface of the grease. The ejectors $O^4$ are shown as tilting the doughnuts upon an inclined slide $O^5$, preferably pervious, so that the grease may continue to drop therefrom as long as the doughnut is above any portion of the pan A. The slide $O^5$ gravitally directs the ejected doughnuts to any suitable container or conveyor the details of which form no part of the present invention. It will be understood that the movement of the ejectors is so timed that they pick up the doughnuts that are passed beyond the end of the tray G, at a time when the tray G has moved toward the feed end of the pan A. In other words, the pan, when it moves toward the feed end, leaves doughnuts free to be picked up, and gives room for the ejector members $O^4$ to pick them up. When the tray G moves back toward the discharge end, then the ejectors $O^4$ are both out of line with it and do not contact it.

To summarize the operation of the device, cut raw doughnuts are dropped into the feed end of the device and are received on the tray E as shown at M in Figure 4. These doughnuts may be discharged simultaneously from the four cutters D shown in Figure 3 and they may be of the same size and shape or of different sizes and shapes depending upon the setting and shape of the cutters. Thereafter, they move step by step toward the discharge end of the pan A, through frictional engagement with the tray member $G^3$. Meanwhile, they are intermittently immersed and permitted to float by the falling and rising of the pan G. Finally, at the discharge end, they are picked up by the ejectors $O^4$ and are discharged from the device.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

I claim:

1. In a cooking device, a pan adapted to contain a cooking medium, and means for heating it, means for delivering a raw article to be cooked to said pan, a tray, positioned below the level of the cooking medium in said pan, adapted initially to receive the raw article, means for moving said tray forwardly along said pan after its reception of the raw article, an additional tray positioned in said pan at a level above that of the first mentioned tray, means for moving said second tray back to and forward from a position to overlie said first tray when the first tray has moved forwardly along the pan, and means, associated with said second tray, for moving the partially cooked article forwardly along the pan.

2. In a cooking device, a pan adapted to contain a cooking medium, and means for heating it, means for delivering a raw article to be cooked to said pan, a tray, positioned below the level of the cooking medium in said pan, adapted initially to receive the raw article, means for moving said tray forwardly along said pan after its reception of the raw article, an additional tray positioned in said pan at a level above that of the first mentioned tray, means for moving said second tray back to and forward from a position to overlie said first tray when the first tray has moved forwardly along the pan, and means, associated with said second tray, for moving the partially cooked article forwardly along the pan, including a pervious top member for said second tray, adapted frictionally to engage the floating partially cooked articles, in response to the buoyancy of the articles in the cooking medium.

3. In a cooking device, a pan adapted to contain a cooking medium, and means for heating it, means for delivering a raw article to be cooked to said pan, and means for conveying the article along said pan from the feed to the discharge end of the pan, including a tray member, and means for reciprocating it forwardly at one level and rearwardly at a higher level, said tray being adapted frictionally to engage the tops of the floating, partially cooked articles, in response to the buoyancy of the articles in the cooking medium, on its forward or low level movement, but being out of contact with the articles during its rearward or high level movement.

4. In a cooking device, a pan adapted to contain a cooking medium, and means for heating it, means for delivering a raw article to be cooked to said pan, and means for conveying the article along said pan from the feed to the discharge end of the pan, including a tray member adapted frictionally to engage the tops of the floating, partially cooked articles, in response to the buoyancy of the articles in the cooking medium, and means for alternately depressing said tray member to a level sufficient to immerse the articles in the cooking medium and for raising it sufficiently to permit the articles to float freely on the surface of the cooking medium, and for moving it forwardly when depressed, and rearwardly when raised.

5. In a cooking device, a pan adapted to contain a cooking medium, and means for heating it, means for delivering a raw article to be cooked to said pan, and means for conveying the article along said pan from the feed to the discharge end of the pan, including a tray member adapted frictionally to engage the tops of the floating, partially cooked articles, in response to the buoyancy of the articles in the cooking medium, and means for alternately depressing said tray member to a level sufficient to immerse the articles in the cooking medium and for raising it sufficiently to permit the articles to float freely on the surface of the cooking medium, and for moving it forwardly when depressed, and rearwardly when raised, the tray member being adapted to drop hot cooking medium upon the exposed upper portions of the articles at times when the articles are floating on the surface of the cooking medium.

6. In a cooking device, a pan adapted to contain a cooking medium, and means for heating it, a conveying tray positioned in said pan and extending along a substantial length thereof said tray overlying the cooking articles as they pass along the pan, and being adapted frictionally to engage the upper portions thereof, and means for imparting to it an intermittent reciprocatory movement and at the same time depressing it into frictional contact with the articles when it is being moved forwardly and raising it out of contact with the articles when it is being moved rearwardly, means adjacent one end of said tray for delivering raw articles to the cooking medium within the pan, and means adjacent the opposite end of the tray for removing cooked articles from the pan.

7. In a cooking device, a pan adapted to contain a cooking medium, and means for heating it, a conveying tray positioned in said pan and extending along a substantial length thereof, and means for imparting to it an intermittent reciprocatory movement, means adjacent one end of said tray for delivering raw articles to the cooking medium within the pan, and means adjacent the opposite end of the tray for removing cooked articles from the pan, said conveying tray overlying the articles within the pan, and being adapted for frictional conveying contact therewith in response to buoyancy of articles in the cooking medium, means for lowering the tray into frictional contact with the articles on the forward stroke, and for raising it from such contact on the rearward stroke.

8. In a cooking device, a pan adapted to contain a cooking medium, and means for heating it, a conveying tray positioned in said pan and extending along a substantial length thereof, and means for imparting to it a reciprocatory movement, means adjacent one end of said tray for delivering raw articles to the cooking medium within the pan, and means adjacent the opposite end of the tray for removing cooked articles from the pan, including an ejector element rotatably mounted adjacent the pan, and means for rotating it, means for lowering the tray into frictional contact with the articles on the forward stroke, and for raising it from such contact on the rearward stroke.

9. In a cooking device, a pan adapted to contain a cooking medium, means for heating it, a conveying tray positioned in said pan and extending along a substantial length thereof, and driving means for imparting to it a reciprocatory movement, means for lowering the tray into frictional contact with the articles on the forward stroke, and for raising it from such contact on the rearward stroke, means adjacent the discharge end of the pan for removing cooked articles from the pan, including an ejector element rotatably mounted adjacent the pan and means for driving it, the driving means for the ejector element and the tray being timed to withdraw the tray longitudinally out of alignment with the ejector element, when the ejector element is rotated through the general horizontal plane of the tray, said ejector element being movable through a path intersecting that of the tray.

10. In a cooking device, a pan adapted to contain a cooking medium, and means for heating it, a conveying tray positioned in said pan, and means for imparting to it a reciprocatory movement, including longitudinal movement above the cooking medium level in one direction and longitudinal movement below the cooking medium level in the opposite direction, said tray overlying the articles in the pan and being adapted for frictional conveying contact therewith in response to buoyancy of the articles in the cooking medium, when the tray is positioned below the cooking medium level.

11. In a cooking device, a pan adapted to contain a cooking medium, and means for heating it, a conveying tray positioned in said pan, and means for imparting to it a reciprocatory movement, including longitudinal movement above the cooking medium level in one direction and longitudinal movement below the cooking medium level in the opposite direction, said tray overlying the articles in the pan and being adapted for frictional conveying contact therewith in response to buoyancy of the articles in the cooking medium, when the tray is positioned below the cooking medium level, means for delivering raw articles to the cooking medium in the pan, adjacent one end of said tray, the end of the tray adjacent the delivery means being provided with a cooking medium pervious impelling flange adapted to engage the recently delivered cooking article when the conveying tray moves toward the discharge end of the pan.

12. In a cooking device, a pan adapted to contain a cooking medium, and means for heating it, a conveying tray positioned in said pan, and means for imparting to it a reciprocatory movement, including longitudinal movement above the cooking medium level in one direction and longitudinal movement below the cooking medium level in the opposite direction, said tray overlying the articles in the pan and being adapted for frictional conveying contact therewith in response to buoyancy of the articles in the cooking medium, when the tray is positioned below the cooking medium level, means for delivering raw articles to the cooking medium in the pan, adjacent one end of said tray, and a receiving tray positioned below the cooking medium level in the pan and means for imparting a longitudinal reciprocation to said receiving tray, said receiving tray being adapted to receive the raw article and to convey it toward the discharge end of the pan and into alignment with the conveying tray.

13. In a cooking device, a pan adapted to contain a cooking medium, and means for heating it, a conveying tray positioned in said pan, and means for imparting to it a reciprocatory movement, including longitudinal movement above the cooking medium level in one direction and longitudinal movement below the cooking medium level in the opposite direction, said tray overlying the articles in the pan and being adapted for frictional conveying contact therewith in response to buoyancy of the articles in the cooking medium, when the tray is positioned below the cooking medium level, means for delivering raw articles to the cooking medium in the pan, adjacent one end of said tray, and a receiving tray positioned below the cooking medium level in the pan and means for imparting a longitudinal reciprocation to said receiving tray, said receiving tray being adapted to receive the raw article and to convey it toward the discharge end of the pan and into alignment with the conveying tray, said conveying tray being provided with a grease pervious impelling flange adapted to engage the recently delivered cooking article as it rises upwardly, in response to the swelling induced by the cooking, when the conveying tray moves toward the discharge end of the pan and away from the receiving tray.

14. In a cooking device, a pan adapted to contain a cooking medium, and means for heating it, a conveying tray positioned in said pan, and means for imparting to it a reciprocatory movement, including longitudinal movement above the cooking medium level in one direction and longitudinal movement below the cooking medium level in the opposite direction, said tray overlying the articles in the pan and being adapted for frictional conveying contact therewith in response to buoyancy of the articles in the cooking medium, when the tray is positioned below the cooking medium level, means adjacent one end of said conveying tray for delivering a plurality of articles to the cooking medium and means, associated with the conveying tray for maintaining a segregation of the articles so delivered.

15. In a cooking device, a pan adapted to contain a cooking medium, and means for heating it, means adjacent one end of said pan for delivering a plurality of articles to the cooking medium at transversely spaced points, means for conveying said articles toward the discharge end of the pan and means, associated with the conveying means, for maintaining segregated the articles delivered at said various points.

16. In a cooking device, a pan adapted to contain a cooking medium, and means for heating it, means adjacent one end of said pan for delivering a plurality of articles to the cooking medium at transversely spaced points, means for conveying said articles toward the discharge end of the pan and means, associated with the conveying means, for maintaining segregated the articles delivered at said various points, the conveying means including a conveying tray adapted for frictional conveying contact with the articles in response to their buoyancy in the cooking medium, said tray being provided with a plurality of guiding members adapted to maintain a transverse segregation of the articles during the conveying operation.

17. In a cooking device, a pan adapted to contain a cooking medium, means for heating it, means adjacent one end of the pan for delivering the articles to be cooked to the heating medium, and means for conveying the articles toward the discharge end of the pan, said means including a tray adapted frictionally to engage the articles as they tend to float while undergoing cooking in the medium, means for imparting to said tray a generally horizontal reciprocation, the movement in one direction being at a different level than the movement at the other direction, and for moving said tray substantially vertically at each change of direction of reciprocation.

18. In a cooking device, a pan adapted to contain a cooking medium, means for heating it, means for conveying articles undergoing cooking toward the discharge end of the pan, said means including a tray and means for imparting to said tray a generally horizontal reciprocation, the movement of the tray in one direction being at a different level than the movement of the tray at the other direction, said means being effective to move said tray substantially vertically at the end of each horizontal movement, to the level occupied by the tray at the next ensuing horizontal movement.

CHARLES E. CARPENTER.